United States Patent

[11] 3,621,365

[72] Inventors William H. Beck
Palos Verdes Peninsula;
Daniel W. Trimble, La Habra, both of Calif.
[21] Appl. No. 63,489
[22] Filed Aug. 13, 1970
[45] Patented Nov. 16, 1971
[73] Assignee The Garrett Corporation

[54] PARALLEL COUPLED STATIC INVERTERS
11 Claims, 2 Drawing Figs.
[52] U.S. Cl. .................................................. 321/27 R,
307/58, 307/82, 307/87, 321/19
[51] Int. Cl. ........................................................ H02m 7/00
[50] Field of Search .......................................... 307/57, 58,
82, 85, 87; 321/19, 27

[56] References Cited
UNITED STATES PATENTS
3,217,171 11/1965 Corey ............................ 307/57
3,343,067 9/1967 Mesenhimer ................ 307/87 X
3,461,374 8/1969 Rhyne, Jr. ..................... 321/19 X
3,549,977 12/1970 Watkins ....................... 307/58 X Primary Examiner—William M. Shoop, Jr.
Attorney—Fraser & Bogucki ABSTRACT: An alternating current power-supply system is disclosed in which plural static inverter modules are coupled in parallel to share a common load. Each inverter module is held in phase synchronization with a common phase reference by circuitry which generates a signal within inverter logic of the module and compares the phase of the generated signal with that of the common phase reference so as to vary the frequency of the generated signal until phase lock is achieved. The output amplitude of each inverter module is normally regulated by circuitry which compares inverter output voltage with a common amplitude reference and makes appropriate adjustments within the inverter based on the comparison so as to render the output voltage equal to the common amplitude reference. Additional amplitude regulation is provided by circuitry which determines the average of the various inverter module output voltages and corrects any inverter module having an output voltage which differs from the determined average.

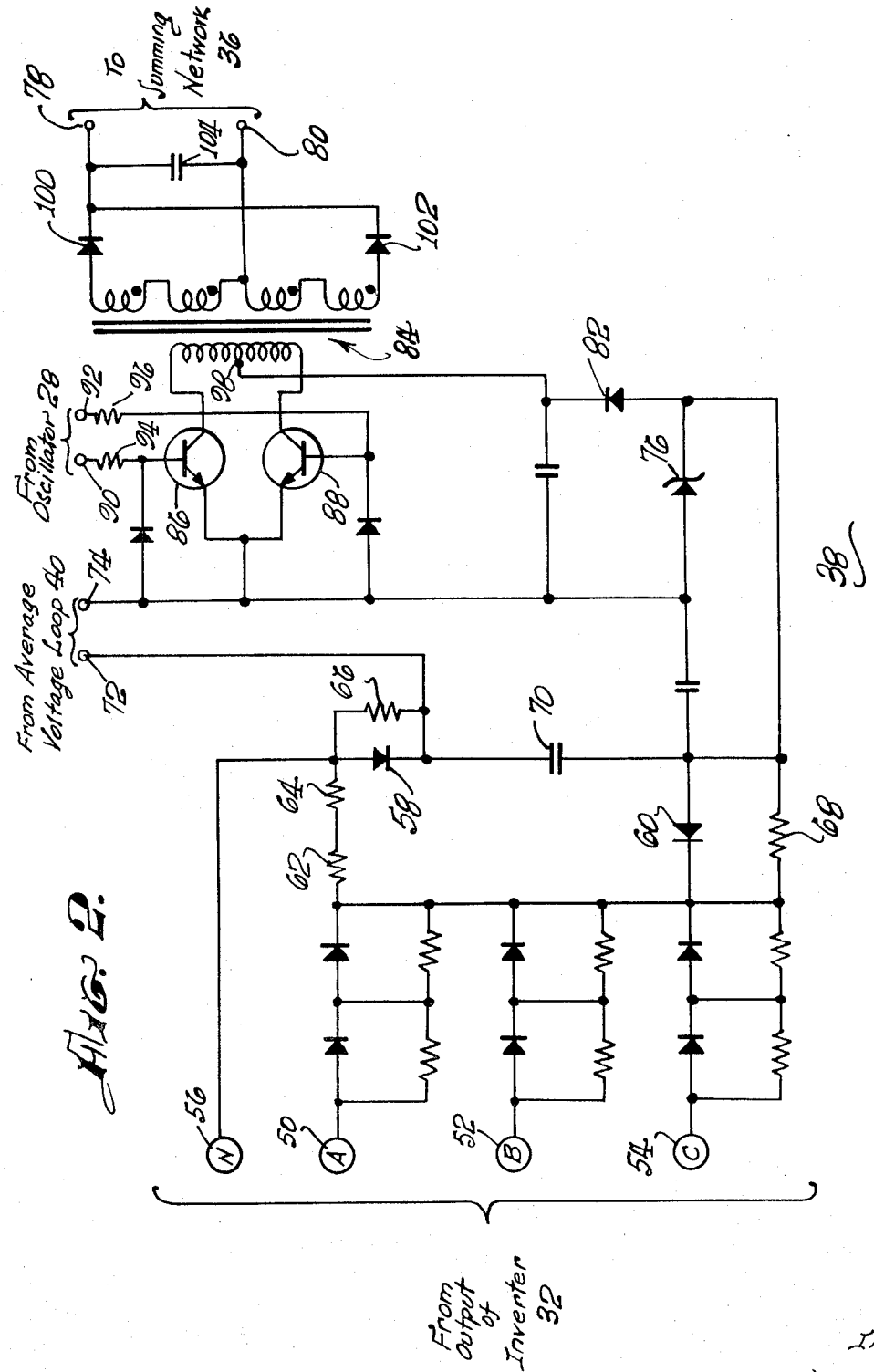

PARALLEL COUPLED STATIC INVERTERS

BACKGROUND OF THE INVENTION

1. Field of the Invention

The present invention relates to static inverter circuits for converting a direct current input into an alternating current output, and more particularly to arrangements in which plural static inverters are coupled in parallel to share a common lead.

2. History of the Prior Art

The techniques for forcing load sharing among rotary generators in parallel are well known and widely used. One such technique employs real and reactive power discriminators to control, respectively, shaft power and output amplitude of the generators. Such techniques, however, are very difficult to successfully apply to high-speed static power conditioning apparatus such as arrangements in which plural static inverters are coupled in parallel. This is especially true when system disturbances must be rapidly coordinated with digital signals to prevent equipment malfunction. If not properly sequenced, static inverters will quite often fail due to excess reverse power flow, high circulating currents between inverters, power device switching interference and the like. Typical of the conditions which cause such malfunctions are the application and removal of short circuits, the insertion and removal of a static inverter from the parallel combination of such inverters, and major load transients.

It has been found that parallel coupled static inverters with output impedances known to be substantially equal can be made to share common loads by maintaining the amplitude of the generated voltages equal and by maintaining the generated voltages in the same phase position. One common technique developed in an attempt to successfully parallel static inverters involves the use of plural transformers at the output of each static inverter. Such transformers which are typically very bulky and expensive are intercoupled with similar transformers at the output of other static inverters and an attempt is made to balance the output amplitudes before coupling to the load. However proper balancing of the inverters is still difficult to achieve with such a scheme, particularly in the presence of heavy or varying loads. Conditions such as periodic short circuits may still produce excess reverse power flow, high-circulating currents between inverters and power device switching interference thereby leading to malfunctioning and in some cases actual failure of the inverters. Moreover, the entire system must typically be shut down each time a previously inactive inverter is to be coupled to the load. Removal of one or more of the inverters from the parallel combination is usually possible only by shorting out the load side of the associated transformers, again leading to undesirable problems and effects.

Accordingly, an object of the present invention is to provide an improved arrangement for paralleling static inverters.

A further object of the invention is to provide a parallel load-sharing arrangement of static inverters in which undesirable transient effects such as the circulation of substantial currents between inverters are significantly minimized or eliminated.

It is a further object of the invention to provide a parallel load-sharing arrangement of static inverters in which one or more of the inverters can be coupled to or uncoupled from the load during operation of the system without the occurrence of undesirable transient effects or inverter malfunction or failure.

A still further object of the invention is to provide an arrangement of parallel, load-sharing static inverters which can withstand short circuits and other substantial load variations during operation without the occurrence of serious transient conditions, inverter malfunction or inverter failure.

BRIEF SUMMARY OF THE INVENTION

In brief, the present invention provides a load-sharing static inverter arrangement in which each of a plurality of static inverter modules may be selectively coupled in parallel to or uncoupled from a common load as desired. Each inverter module responds to common external phase and amplitude references to provide output signals having a selected phase and amplitude. In addition each inverter module includes circuitry interconnected with the corresponding circuitry of the other inverter modules which determines the average output amplitude of those modules coupled to the load and which overcomes the effects of the amplitude reference and corrects the output amplitude of any module which varies from the average amplitude.

Each inverter module is phase locked to the common external phase reference by a circuit loop which establishes timing information used by the inverter logic to maintain exact phase position between the inverter module output voltage and the reference phase position. The phase of a common external-phase-reference signal is compared with that of a signal fed back from the inverter logic in an appropriate summing network such as a differential amplifier. The output of the summing network is applied to drive an oscillator about a nominal frequency which may be equal to or a multiple of the fundamental frequency of the common external-phase-reference signal. Differences between the phase-reference signal and the feedback signal as determined by the summing network are applied to increase or decrease the oscillator frequency so as to bring about and maintain phase synchronization between the oscillator and the phase-reference signal. The output of the oscillator is either applied directly to the summing device as the feedback signal where the oscillator operates at a nominal frequency equal to the fundamental frequency of the phase-reference signal, or is stepped or counted down by the inverter logic to provide the feedback signal in the event the oscillator operates at a nominal frequency which is a multiple of the fundamental frequency of the phase-reference signal.

The output amplitude of each inverter module, whether coupled to or uncoupled from the load is normally regulated by circuitry which compares the module output amplitude with a common external-amplitude-reference signal. A second summing network provides to amplitude control circuitry within the inverter error signals representing the difference between the common external-amplitude-reference signal and a feedback signal from the output of an AC filter coupled to the output of the static inverter. The amplitude-control circuitry responds to the error signal by changing the inverter output amplitude without affecting the phase position thereof.

The output amplitudes of those inverter modules coupled to the load are further regulated by amplitude-matching circuitry, the function of which is to determine any difference between the individual inverter module output voltages in the parallel array. This is accomplished by circuitry which includes a different voltage difference detector coupled in each inverter module. Each voltage difference detector determines the average of all output signals of the associated inverter module and passes the resulting signal to all other detectors in the different inverter modules. If the average voltage at the output of one inverter module is larger than the the others, current flows from the associated detector in one direction and continues through the other detectors in the opposing relative direction. The detectors differentiate between the direction of current flow such that appropriate error signals are delivered to the amplitude-control circuitry within the various inverter modules to modify the normal amplitude command. This process continues until all module output amplitudes are matched within design limits and the errors are minimized.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 2 is a schematic diagram of a preferred embodiment of a voltage difference detector for use in the arrangement of FIG. 1.

DETAILED DESCRIPTION

Figure 1:
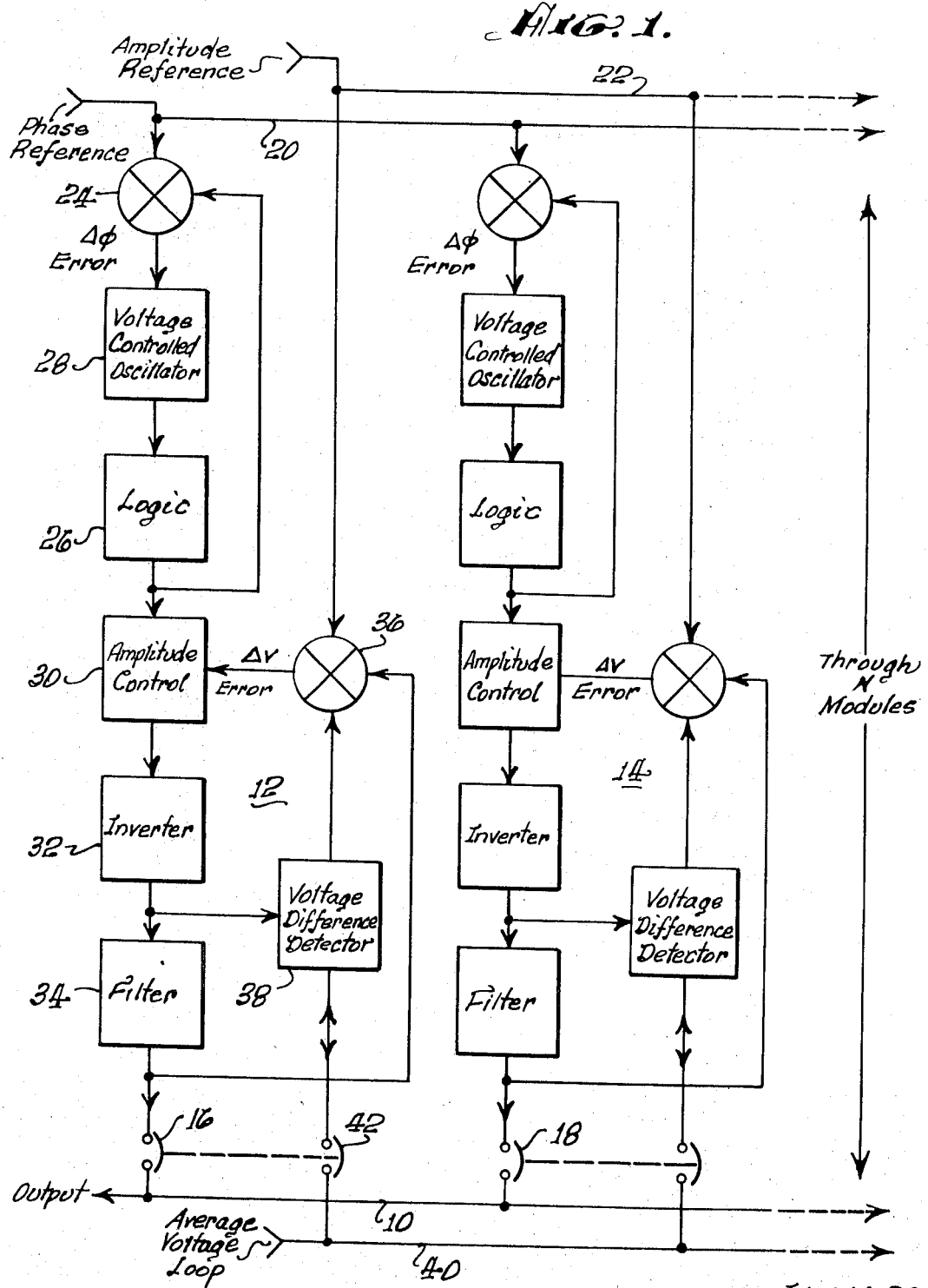
FIG. 1 is a block diagram of one preferred arrangement of parallel coupled, load-sharing static inverters according to the invention.

FIG. 1 illustrates one preferred load-sharing arrangement of parallel coupled static inverters according to the invention. In the particular arrangement of FIG. 1 an appropriate number N of static inverter modules are arranged so as to be available for coupling in parallel to supply power to a common load via an output line 10 common to all modules, although only two such modules 12 and 14 are shown for simplicity of illustration. The various static inverter modules 12, 14 and others are virtually identical in construction as seen in FIG. 1. As will be seen from the discussion to follow each module includes one or more static inverter circuits for producing a single-phase or polyphase output as desired together with circuitry for regulating the phase and amplitude of the outputs.

As previously noted load sharing by the various static inverter modules may be accomplished if all of the modules to be coupled to the common load are phase locked with respect to a common phase reference and are amplitude regulated such that the output amplitudes of the various modules are substantially equal to one another and to a common amplitude reference. The various static inverter modules are individually coupled to or uncoupled from the common output line 10 as desired in order to meet the demands of the common load being supplied by the various modules. As shown in FIG. 1 the particular static inverter modules 12 and 14 are selectively coupled to the common output line 10 by switches 16 and 18 respectively. The common phase reference is provided to a line 20 common to all modules and may comprise an external oscillator or other appropriate circuit for providing a common phase-reference signal of any appropriate waveform, preferable a square wave, to the common line 20. The common amplitude reference is provided to a line 22 common to all modules and may comprise any appropriate external circuit for providing to the line 22 a signal, for example 120 volts, representing a desired output amplitude for each of the static inverter modules.

Since the various static inverter modules are identical in construction and operation, only the module 12 will be hereafter described. The module 12 includes a summing network 24 coupled to receive the phase-reference signal together with a feedback signal from inverter logic circuitry 26. The output of the summing network 24 is coupled through a voltage controlled oscillator 28 to the logic circuitry 26. The voltage controlled oscillator 28 operates at a nominal frequency which may be equal to or a multiple of the fundamental frequency of the phase-reference signal. Where the oscillator 28 operates at nominal frequency which is N times the fundamental frequency $f$ of the phase-reference signal or $Nf$, the logic circuitry 26 counts down the frequency at the output of the oscillator 28 so as to effectively divide the output frequency by the factor N and provide a signal at the fundamental frequency $f$ as the feedback signal to the summing network 24. Where the oscillator 28 operates at a nominal frequency equal to the fundamental frequency $f$ of the phase-reference signal, the count down provided by the logic circuitry 26 is not needed and the oscillator output may be coupled directly to the summing network 24 to provide the feedback.

The feedback signal from the output of the logic circuitry 26 which is preferably a square wave is phase compared with the phase-reference signal at the summing network 24 to drive the voltage controlled oscillator 28 accordingly. Since the external phase-reference signal is also preferably a square wave, the two input signals to the network 24 may have their leading or trailing edges compared once each cycle to determine the phase difference, if any. The summing network 24 thus provides to the oscillator 28 a phase error signal $\Delta \Phi$ representing the difference in phase between the reference signal and the feedback signal. If the feedback signal lags the phase-reference signal, the resulting phase error signal at the output of the summing network 24 increases the frequency of the oscillator 28 so as to bring the phase-reference and feedback signals into phase synchronism. Conversely, if the feedback signal leads the phase-reference signal, the resulting signal at the output of the summing network 24 decreases the frequency of the oscillator 28 so as to again bring about phase synchronism.

The corresponding circuitry of the static inverter module 14 and the other modules functions in similar fashion to provide signals which are phase locked to the common phase-reference signal at the line 20.

At this point reference is made to a copending application of William H. Beck, Serial No. 34,833, entitled "Polyphase Inverter System" and assigned to the same assignee as the present application. Application, Ser. No. 34,833 discloses beginning with FIG. 10 thereof a polyphase inverter system of the type which may be used in each of the inverter modules of the present invention, and accordingly reference is made thereto for the specific details of the static inverters which are only generally illustrated in FIG. 1. In the static inverter of application, Ser. No. 34,833 the summing junction 24 comprises an error circuit in the form of a differential amplifier for driving a clocking circuit in the form of a voltage controlled oscillator (corresponding to the oscillator 28 of the present invention) at a nominal frequency equal to 12 times the fundamental frequency. The $12f$ clock frequency is needed in order to properly control the digital circuitry employed in the operation of the inverter output gates. The $12f$ clock frequency is substantially reduced to the fundamental frequency $f$ by clock binary and ring counter circuitry with a square wave signal of frequency $f$ at the output of the ring counter circuitry being fed back to the error circuit as the feedback signal.

The particular phase-locking technique described thus far in connection with FIG. 1 lends itself readily to use with digital equipment and provides for phase synchronism within 0.1 percent or less using readily available components. It will be appreciated that a plurality of such circuits maintain close tolerance phase synchronism when operated with a common phase-reference signal input such as provided on the common line 20.

The output of the logic circuit 26 is coupled through amplitude control circuitry 30 to a static inverter 32 for generation of output signals having the desired phase position, as described in detail in application, Ser. No. 34,833. The static inverter 32 may comprise gate matrices and gate drivers for operating a plurality of inverter gates in desired sequence, and output transformers coupled to the inverter gates for providing a three-phase output, as disclosed in application, Ser. No. 34,833. The output-coupled transformers perform a step-wave synthesis that approximates the envelope of a sine wave. An AC filter 34 operates on such waveforms so as to eliminate higher order harmonics and provide the desired sinusoidal output waveforms to the load via the common line 10.

The filer 34 includes series output inductance which is inserted so as to limit harmonic current but which is also normally sized in a manner similar to that of a rotary generator. In the case of a static inverter the output voltage ahead of the inductance is available for processing. In rotary generators, on the other hand, the analogous voltage is difficult to separate from the machine reactance. The filter inductance in addition to filtering harmonics also serves to buffer the load so as to allow for short circuit conditions and the like.

The output amplitude of the static inverter module 12 is regulated by the amplitude control circuitry 30 in combination with a second summing network 36 having its output coupled to the amplitude control circuitry 30 and having a first input coupled to the common external-amplitude-reference line 22 and a second input coupled to receive a feedback signal from the output of the filter 34. Differences between a reference voltage provided by the line 22 and the filter 34 output voltage are applied to the amplitude control circuitry 30 in the form of a voltage error signal Δ v to make appropriate changes such that the output voltage from the filter 34 is made to equal or substantially equal the reference voltage. The voltage at the output of the filter 34 is continuously regulated in accordance with the reference voltage regardless of whether the module 12 is coupled to or uncoupled from the common load by the switch 16.

The output of the filter 34 is used to provide the feedback to the summing network 36 since it represents the true output of the module 12. Although the output voltage from the inverter 32 approximates the filter output voltage for light or constant loads, a considerable voltage drop may occur across the filter 34 for heavy or varying loads dictating that the filter output voltage be used to provide the feedback signal. The summing network 36 may comprise an error circuit in the form of a differential amplifier for comparing the feedback voltage with the reference voltage, and the amplitude control circuitry 30 may comprise circuitry for varying the inverter dwell angle in accordance with the voltage error signal Δ v, as described in detail in application, Ser. No. 34,833.

The amplitude regulation provided by comparison of the reference voltage from the common line 22 with the output voltage from the filter 34 is adequate to prevent module malfunction due to transients and other conditions when the modules involved are coupled to the load and the load remains relatively constant. However, during other than ideal operating conditions such as when a short circuit occurs or when one or more modules are being coupled to or uncoupled from the load, the normal amplitude regulating circuitry may not be sufficient to prevent undesirable transient effects and possible system malfunction. Such inability may be due to a number of factors such as different time constants in the different modules. As the load changes the module voltages change at different rates due to such time-constant differences, resulting in circulating currents and other undesirable effects.

In accordance with the invention amplitude regulation problems which are other wise present during periods of load variation and the like are compensated for by an arrangement which determines the average output amplitude of the various static inverter modules and which makes appropriate adjustments within the modules so as to render and maintain the output amplitudes of the individual modules substantially equal to the average amplitude. As shown in FIG. 1 each of the static inverter modules includes a voltage difference detector 38 having an output coupled to the summing network 36, a first input coupled to the output of the static inverter 32, and a second input coupled to an average voltage loop 40 via a switch 42. The detector 38 thus remains inactive when the associated module is uncoupled from the load and comes into operation only when the module is coupled to the load by closure of the switch 42.

With one or more of the modules coupled to the common load the associated voltage difference detectors 38 act to establish in the loop 40 a voltage representing the average output voltage of the various modules so connected. Each detector 38 in turn compares the average voltage from the loop 40 with the average voltage at the output of the associated static inverter 32. If a difference exists current flows into or out of the detector 38 from the loop 40 depending upon whether the inverter output voltage is less than or greater than the average voltage. The voltage difference detector 38 responds to such current flow to temporarily disable the effects of the reference voltage from the line 22 and the feedback voltage from the filter 34 output at the summing network 36 and pass to the amplitude control circuitry 30 via the summing network 36 an error signal representing the difference between the module output voltage and the average voltage at the loop 40. The amplitude control circuitry 30 responds by rapidly changing the inverter output voltage until it substantially equals the voltage at the loop 40. Since the phase of the inverter output voltage is locked by the phase-locking loop of each module, the average voltage at the loop 40 can be determined very rapidly because ripple components tend to be equal and are synchronized. This characteristic permits rapid response of the loop 40 to individual module deviations from the system average.

It is important to note that proper paralleling of the modules may be achieved only when the amplitude regulation does not disturb the phase position which has been determined by the phase lock portion of the circuitry. However amplitude regulation does not affect the already established phase in the present example, and as apparent from the more detailed discussion of the inverter circuit shown in application, Ser. No. 34,833 the amplitude control circuitry 30 maintains conduction of power to the filter 34 symmetrical about the phase position already established.

As described thus far the voltage difference detector 38 functions so as to bidirectionally pass voltage error signals of either sense to the amplitude control circuitry 30 so as to correct an output voltage which is lower than or higher than the average voltage. In actual practice, however, it may be desirable for certain applications to employ a detector 38 which changes the output voltage in unidirectional rather than bidirectional fashion so as to correct only for module output voltages which exceed the average voltage of all modules. An arrangement of this type avoids the possibility of system overvoltage which might be damaging to load components. The individual modules are thus corrected to match the amplitude of the lowest generated voltage in the parallel array, and the detector 38 can produce an additional input to the amplitude summing network 36 of a module only when the average output voltage of the associated inverter 32 exceeds the average output voltage of all the connected inverter modules.

One preferred embodiment of the voltage difference detector 38 of FIG. 1 is schematically illustrated in FIG. 2. The particular detector 38 of FIG. 2 changes the output voltage of the associated inverter 32 in unidirectional rather than bidirectional fashion and is arranged to receive a three-phase output from the inverter 32. The three different output phases as applied to the detector are designated "A," X "B" and "C" and the neutral terminal is designated "N." The detector 38 forms a voltage representative of the module average by half-wave rectifying and filtering the line-to-neutral voltages from the output of the inverter 32 applied at input terminals 50, 52, 54 and 56. The various voltages as so rectified and filtered by appropriate arrangements of diodes and resistors are applied by diodes 58 and 60 and resistors 62, 64, 66 and 68 to a capacitor 70 where they are averaged. This average voltage is directed toward similar circuits in the other static inverter modules via a pair of terminals 72 and 74 which are common to all paralleled modules.

If the average voltage on the capacitor 70 is less than the average voltage on the averaging capacitor of a similar circuit in one of the other modules, current is received at the terminal 74 and flows to the terminal 72 via a path including a diode 76 and the averaging capacitor 70. This action produces no effect on the circuit output to a pair of terminals 78 and 80 which are coupled to the summing network 36. However, if the voltage on the averaging capacitor 70 is higher than the voltage on the averaging capacitor of similar circuitry in another module, current flows through a diode 82, through the primary winding of a transformer 84, and through one or the other of a pair of alternately conducting transistors 86 and 88 to the terminal 74. The transistors 86 and 88 are alternately driven by the voltage controlled oscillator 28 via a pair of terminals 90 and 92 and associated resistors 94 and 96. The current from the diode 82 which flows into the center tap 98 of the transformer 84 primary winding is alternately directed through the two different legs of the primary winding in accordance with the alternate conduction of the transistors 86 and 88. This action produces a square wave at the secondary of the transformer 84. The secondary waveform is full-wave rectified by a pair of diodes 100 and 102 and filtered by a capacitor 104 to present an amplitude error signal to the summing network 36 via the terminals 78 and 80. The summing network 36 is arranged so as to temporarily disable the effects of the inputs from the common external amplitude-reference line 22 and the feedback signal from the filter 34 output whenever an error signal is directed thereto by the voltage difference detector 38. The error signal from the detector 38 is passed by the summing network 36 to the amplitude control circuitry 30 to decrease the module output voltage until conditions of minimum error are established.

It will be appreciated by those skilled in the art that paralleling circuitry employing techniques according to the invention involves relatively low cost, simplified circuitry having very high speeds of response. Accuracy in the paralleling characteristics may be achieved to virtually any degree required, and the possibilities of interaction between the various inverter modules are greatly minimized. Moreover, if desired, any one or more of the inverter modules can be tested to determine its capability without actually inserting it into the parallel array of modules.

The output regulation of the inverter modules has been described in terms of voltage matching for convenience of illustration only, and it should be understood by those skilled in the art that current matching may instead be used by appropriate modification of the circuitry described. Moreover, where desired different inverter modules may be arranged so as to share the common output load unequally rather than equally. This may be desirable where two or more inverter modules of different capability are to be paralleled. When such is the case unequal sharing of the load can be effected by changing the common external amplitude reference as applied to the different inverter modules, the modules with the lower reference voltages providing the greater amount of output power to the common load.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for selectively coupling a plurality of alternating waveform-generating inverter modules in parallel to share a common output load comprising the combination of:
   means associated with each inverter module and responsive to a common phase reference for maintaining the phase of the inverter module in synchronism with the common phase reference;
   means associated with each inverter module and responsive to a common amplitude reference for maintaining the output amplitude of the inverter module substantially equal to the common amplitude reference; and
   means associated with each inverter module and coupled to other ones of the plurality of inverter modules for maintaining the output amplitude of the associated inverter module close in value to the average output amplitude of the plurality of inverter modules.

2. An arrangement in accordance with claim 1, wherein the means for maintaining the output amplitude of the inverter module substantially equal to the common amplitude reference includes means for comparing the output amplitude of the inverter module with the common amplitude reference to provide an amplitude error signal in accordance with differences therebetween, and means for regulating the output amplitude of the inverter module in accordance with the amplitude error signal and without changing the phase of the inverter module.

3. An arrangement in accordance with claim 1, wherein the means for maintaining the output amplitude of the associated inverter module close in value to the average output amplitude of the plurality of inverter modules includes average amplitude loop means coupled to each inverter module for determining the average output amplitude of the plurality of inverter modules, means associated with each inverter module and coupled to the average amplitude-loop means for circulating current between the associated inverter module and the average amplitude-loop means in accordance with differences between the output amplitude of the associated inverter module and the average output amplitude of the plurality of inverter modules, and means associated with each inverter module and responsive to the circulated current for changing the output amplitude of the associated inverter module in accordance with the value of the circulated current.

4. An arrangement in accordance with claim 1, wherein the means for maintaining the output amplitude of the associated inverter module close in value to the average output amplitude of the plurality of inverter modules is operative only when the associated inverter module is coupled to the common output load.

5. An arrangement in accordance with claim 1, wherein the means for maintaining the phase of the inverter module in synchronism with the common phase reference includes means for generating an alternating signal, means for comparing the phase of the alternating signal with the common phase reference to provide a phase error signal in accordance with phase differences therebetween, and means for varying the frequency of the alternating signal in accordance with the phase error signal.

6. An arrangement in accordance with claim 5, wherein the means for generating an alternating signal comprises means for generating a second alternating signal having a variable frequency which is nominally N times a fundamental frequency, and means responsive to the second alternating signal for dividing the frequency thereof by N to derive the first-mentioned alternating signal.

7. In an arrangement in which a plurality of alternating waveform-generating inverters are selectively coupled in parallel to share a common load, each of the inverters being phase locked to a common load, each of the inverters being phase locked to a common phase reference and being normally amplitude regulated in accordance with a common amplitude reference, the improvement comprising means intercoupled between the plurality of inverters for determining the average amplitude of the inverters coupled to the common load, and means associated with each inverter coupled to the common load for changing the amplitude thereof as necessary so as to substantially equal the average amplitude of the inverters coupled to the common load.

8. The combination defined in claim 7, wherein the means associated with each inverter coupled to the common load for changing the amplitude thereof includes a voltage difference detector, and the means for determining the average amplitude includes an average-voltage loop and means for coupling the voltage-difference detector of each inverter coupled to the common load to the average-voltage loop.

9. In an arrangement in which a plurality of inverters are coupled in parallel to share a common load, a circuit for determining the average output voltage of the plurality of static inverters and adjusting the output voltage of each static inverter to a minimum difference from the average output voltage comprising separate detector means associated with each of the plurality of static inverters, each of the detector means including means for determining the average output voltage of the associated static inverter, and circuit means coupling each of the detector means to all other detector means to establish current flows into and out of the various detector means in accordance with differences in the average output voltages determined by the detector means, each of the detector means further including means responsive to a current flow thereat to change the output voltage of the associated static inverter in a sense and by an amount determined by the direction and magnitude of the current flow.

10. The combination defined in claim 9, wherein the means responsive to a current flow thereat to change the output voltage of the associated static inverter is operative to change the output voltage of the associated static inverter only in response to a current flow in a given direction.

11. The combination defined in claim 9, wherein the means for determining the average output voltage of the associated static inverter includes separate means responsive to each output signal phase from the associated static inverter for rectifying and filtering the output signal phase and capacitor means coupled to receive each rectified and filtered output signal phase for determining the average voltage thereof, wherein the circuit means coupling each of the detector means to all other detector means to establish current flows includes an average-voltage loop and means within each detector means for coupling the average-voltage loop in a circuit path including the capacitor means to permit current flows from the average voltage loop through the circuit path and included capacitor means, and wherein the means responsive to the current flow thereat to change the output voltage of the associated static inverter includes transformer means having primary and secondary windings, means responsive to current flows through the circuit path and included capacitor means for applying the current flows to the primary winding in periodically reversing fashion to establish an alternating current in the secondary winding, and means for rectifying and filtering the alternating current in the secondary winding to provide a voltage error signal to the associated static inverter.

* * * * *

PO-1050
(5/69)

UNITED STATES PATENT OFFICE
CERTIFICATE OF CORRECTION

Patent No. 3,621,365          Dated November 16, 1971

Inventor(s) William H. Beck et al

It is certified that error appears in the above-identified patent and that said Letters Patent are hereby corrected as shown below:

Column 1, line 9, "lead" should read --load--. Column 4, line 19, after "Application" (second occurrence) delete the comma (","); line 25, after "plication" delete the comma (","); line 46, "circuit" should read --circuitry--; line 49, after "application" delete the comma (","); line 53, after "application" delete the comma (","); line 60, "filer" should read --filter--. Column 5, line 22, after "application" delete the comma (","); line 40, "other wise" should be --otherwise--. Column 6, line 11, after "application" delete the comma (","); line 39, after " "A" " and before " "B" " delete "X". Column 7, line 2, "externalnamplitude" should read --external-amplitude--. Column 8, line 33, after "load," delete "each of the inverters being"; line 34, before "each" delete "phase locked to a common load,"; line 51, after "of" and before "inverters" insert --static--.

Signed and sealed this 18th day of July 1972.

(SEAL)
Attest:

EDWARD M. FLETCHER, JR.          ROBERT GOTTSCHALK
Attesting Officer          Commissioner of Patents